United States Patent
Berke et al.

(10) Patent No.: US 10,229,081 B2
(45) Date of Patent: Mar. 12, 2019

(54) SYSTEM LEVEL CROSSTALK MITIGATION

(71) Applicant: DELL PRODUCTS, LP, Round Rock, TX (US)

(72) Inventors: Stuart Allen Berke, Austin, TX (US); Bhyrav M. Mutnury, Round Rock, TX (US); Vadhiraj Sankaranarayanan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 177 days.

(21) Appl. No.: 15/276,240

(22) Filed: Sep. 26, 2016

(65) Prior Publication Data

US 2018/0089125 A1 Mar. 29, 2018

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01)

(58) Field of Classification Search
CPC .......................... G06F 13/4022; G06F 13/4282
See application file for complete search history.

(56) References Cited

U.S. PATENT DOCUMENTS

| | | | |
|---|---|---|---|
| 5,003,308 A | 3/1991 | Furniss et al. | |
| 5,692,910 A | 12/1997 | Mittal | |
| 7,731,506 B2 | 6/2010 | Lo et al. | |
| 8,143,527 B2 | 3/2012 | Lo et al. | |
| 8,305,871 B2* | 11/2012 | Zerbe | H04L 25/14 326/16 |
| 8,811,528 B2 | 8/2014 | Hughes et al. | |
| 8,923,371 B2 | 12/2014 | Sindalovsky et al. | |
| 9,105,324 B2 | 8/2015 | Swanson et al. | |
| 9,231,752 B1 | 1/2016 | Yan et al. | |
| 2002/0196492 A1* | 12/2002 | Trisnadi | G02B 6/2713 398/79 |
| 2007/0206954 A1* | 9/2007 | Fishman | H04B 10/2513 398/159 |
| 2008/0159551 A1* | 7/2008 | Harley | H04M 9/082 381/66 |
| 2013/0103927 A1* | 4/2013 | Berry, Jr. | G06F 15/00 712/30 |

* cited by examiner

*Primary Examiner* — Henry Tsai
*Assistant Examiner* — John B Roche
(74) *Attorney, Agent, or Firm* — Larson Newman, LLP

(57) ABSTRACT

An information handling system includes a receiver and a transmitter. A margin detector of the receiver derives an eye plot for signals received via a plurality of high speed serial lanes. A first control module of the receiver identifies a weakest lane of the high speed serial lanes, and compares eye plots for a signal on the weakest lane from one crosstalk minimization iteration to the next. A second control module of the transmitter receives a signal from the first control module indicating whether an eye plot of the signal has improved from one crosstalk minimization iteration to the next, and iteratively controls a phase shift of aggressor signals in the high speed serial lanes during each iteration until the eye plot of the signal remains the same from one iteration to the next. A phase shift module of the transmitter phase shifts the aggressor signals during each iteration.

20 Claims, 4 Drawing Sheets

SYSTEM LEVEL CROSSTALK MITIGATION

FIELD OF THE DISCLOSURE

This disclosure generally relates to information handling systems, and more particularly relates to system level mitigation of crosstalk in serial lanes.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a receiver having a margin detector and a first control module. The margin detector derives an eye plot for a plurality of signals received via a plurality of high speed serial lanes. The first control module identifies a weakest lane of the high speed serial lanes, and compares eye plots for the first signal on the weakest lane from one crosstalk minimization iteration to a next crosstalk minimization iteration. A transmitter includes a second control module and a phase shift module. The second control module receives a signal from the first control module indicating whether an eye plot of the first signal has improved from one crosstalk minimization iteration to the next, and iteratively controls a phase shift of aggressor signals in the high speed serial lanes during each crosstalk minimization iteration until the eye plot of the first signal is optimized. The phase shift module phase shifts the aggressor signals during each iteration of the crosstalk minimization iterations.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
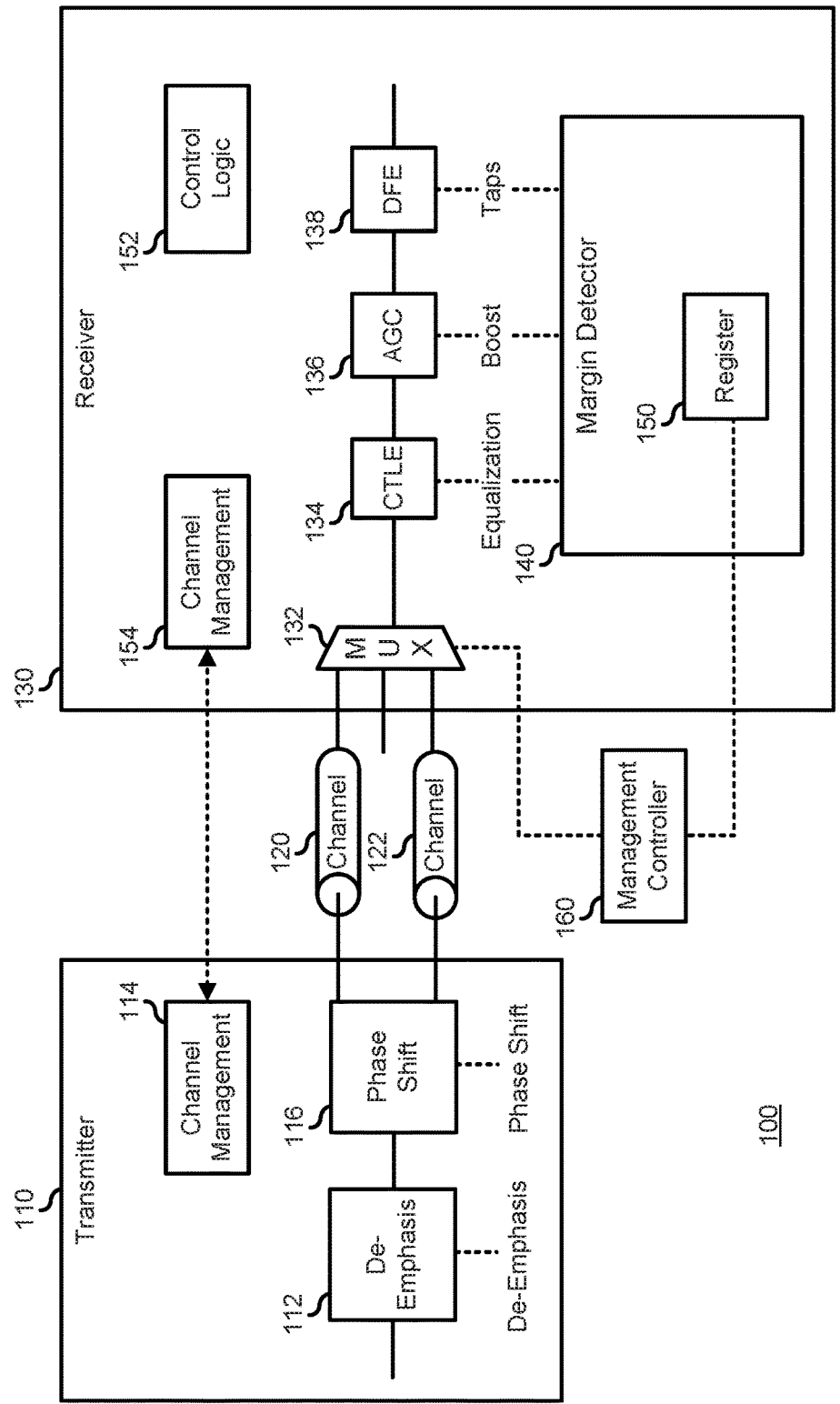
FIG. 1 illustrates a high speed serial interface according to an embodiment of the present disclosure.

FIG. 1 illustrates an embodiment of a high speed serial channel 100 of an information handling system. For the purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 100 includes a transmitter 110, multiple transmission channels, such a transmission channels 120 and 122, and a receiver 130. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 includes a PCI-Express (PCIe) channel that is in compliance with one or more PCIe specification, up to, and including the PCIe 4.0 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, user programmatic interface (UPI), Infiniband, extended attachment unit interface (XAUI), or another high speed serial channel.

Serial channel 100 operates to provide back channel adaptation where transmitter 110 and receiver 130 communicate with each other to optimize and adjust various compensation values within the transmitter and the receiver to compensate for the insertion loss of transmission channel 120. A determination is made as to whether or not a set of compensation values is satisfactory based upon a determination of the bit error rate (BER) associated with the set of values. It is possible for multiple different sets of compensation values to result in acceptable BER in serial channel 100. Moreover, even on a particular information handling system, operating at different times, the back channel adaptation mechanism may operate to provide different sets of compensation values based upon minute variations in the operating condition of the information handling system.

As such, serial channel 100 operates to perform the back channel adaptation repeatedly, recording the set of compensation values for each iteration of the back channel adaptation, in order to determine a most common or most frequently recurring set of compensation values. Then serial channel 100 further operates to use the most frequently recurring set of compensation values as a seed for further optimization of the receiver eye in order to determine the final run time set of compensation values.

For example, a typical back channel adaptation operation can operate at a 10 gigabit per second (Gb/s) data rate, and can provide a training sequence of 2000 bits, such that the back channel adaptation operation takes 200 microseconds (μs), and serial channel 100 can operate to provide 1000 iterations of the back channel adaptation operation, such that the common set of compensation values is determined in 0.2 s. Using the common set of compensation values, serial channel 100 can adjust each value of the common set of compensation values by +/−1 setting value, and re-run the back channel adaptation operation in order to determine if the receiver eye is improved. Serial channel 100 can then select the set of values that produces the best receiver eye.

Transmitter 110 includes a de-emphasis module 112, a channel management module 114, and a phase shift module 116. In operation, serial data is provided to de-emphasis module 112, and the de-emphasis module operates to provide a reduction in the signal levels of the serial data after a first data bit is transmitted, in order to de-emphasize the subsequent data bits. The phase shift module 116 operates to receive the de-emphasized data bits, to provide a phase shift to the data bits, and to transmit the phase shifted de-emphasized serial data to receiver 130 via transmission channel 120. Channel management module 114.

Receiver 130 includes a multiplexor 132, a continuous time linear equalization (CTLE) module 134, an automatic gain control (AGC) module 136, a decision feedback equalization (DFE) module 138, a margin detector 140, a control logic module 152, and a channel management module 154. During back channel adaption operation, the CTLE module 134, the AGC module 136, and the DFE module 138 perform an iterative process to ensure that the receiver 130 compensates for channel loss. In operation, during the back channel adaption operation, the first serial data provided to the receiver 130 is not phase shift, such that the serial data is only de-emphasized. The de-emphasized serial data is received by multiplexor 132, the multiplexor provides the received signal to CTLE module 134, and the CTLE module operates to provide compensation for inter-signal interference (ISI) in order to open the signal eye of the received signal. The amount of compensation is determined based upon an equalization setting. For example, receiver 130 can support 21 equalization settings which each prescribe a different amount of equalization, from 0 dB to 10 dB, in 0.5 dB steps. Other numbers of settings and amounts of equalization prescribed by the equalization setting can be utilized, as needed or desired.

The equalized signal is provided from CTLE module 134 to AGC module 136. AGC module 136 operates to provide linear gain to the signal received from CTLE module 134 to further open the signal eye of the received signal. The amount of gain is determined by a gain setting, and can support 21 gain settings which each prescribe a different amount of gain, for example, from 0 dB to 10 dB, in 0.5 dB steps. Other numbers of settings and amounts of gain prescribed by the gain setting can be utilized, as needed or desired.

The amplified signal is provided from AGC module 136 to DFE module 138. DFE module 138 operates to provide feedback based compensation to the received signal. The amount of compensation is determined by enabling a number of circuit feedback taps. For example, DFE module 138 can support up to 16 taps that provide compensation based upon up to 16 previous data points. In a particular embodiment, DFE module 138 can be turned off, thereby reducing the power consumed by receiver 130. In another embodiment, one or more tap of DFE module 138 can be turned on based upon the taps setting, while the rest of the taps are placed into a tri-state condition, that is, with power applied, but with the taps not providing feedback to the resultant DFE compensation. In yet another embodiment, one or more tap of DFE module 138 can be turned on based upon the taps setting, while the rest of the taps are turned off, thereby reducing the power consumed by receiver 130. Other numbers of taps can be utilized, as needed or desired.

Register 150 stores the eye height and eye width information in order to determine a set of compensation values that provides the best receiver eye for receiver 130. A management controller 160 operates to coordinate the determination of receiver eye information for multiple serial channels similar to serial channel 100. As such, multiplexor 132 operates to receive inputs from multiple transmission channels similar to transmission channel 120, and selectively routes the received signals to margin detector 140. In this way, a multi-channel device can include a single set of elements for determining the receiver eye information of multiple transmission channels.

In operation, control logic module 152 performs the back channel adaptation repeatedly, recording the set of compensation values for each iteration of the back channel adaptation in a memory of receiver 130, in order to determine a most common or most frequently recurring set of compensation values. In a particular embodiment, only the set of compensation values for receiver 130 are considered in determining the most frequently recurring set of compensation values. In another embodiment, the compensation values for both transmitter 110 and receiver 130 are considered in determining the most frequently recurring set of compensation values. In a particular embodiment, the memory includes a counter associated with each particular combination of compensation value settings, and each time a particular set of compensation values is derived, the counter is incremented. Then, when the iterations of the back channel adaptation are complete, control logic module 152 determines which counter includes the highest count. In another embodiment, receiver 130 includes a number of storage locations that is equal to the number of iterations, and on each successive iteration, the set of compensation values for that iteration are stored in the associated storage location. Then, when the iterations of the back channel adaptation are complete, control logic module 152 parses the values of the storage locations to determine the most common value.

Control logic module 152 then uses the most common set of compensation values as a seed for further optimization of the receiver eye, by directing the phase shift module 116 to iteratively adjust the phase shift of the serial data in neighboring transmission channels by +/−one (1) setting value, and direct the signal received on transmission channel 120 through multiplexor 132 to margin detector 140 to determine the receiver eye height and eye width of the serial data on transmission channel 120 associated with each adjusted setting. Also, during the back channel adaption operation, the channel management modules 154 and 114 can communicate to reduce crosstalk between the different communication channels in the system, such as communication channels 120 and 122. The channel management module 154 can provide data associated with an eye plot to the channel management module 114, which in turn can cause the phase shift module 116 to provide phase shift signals to compensate for crosstalk between the high speed lanes of the communication channels as shown in a pin-out of a printed circuit board (PCB) 200 of FIG. 2, that the transmitter receives the signals from.

Figure 2:
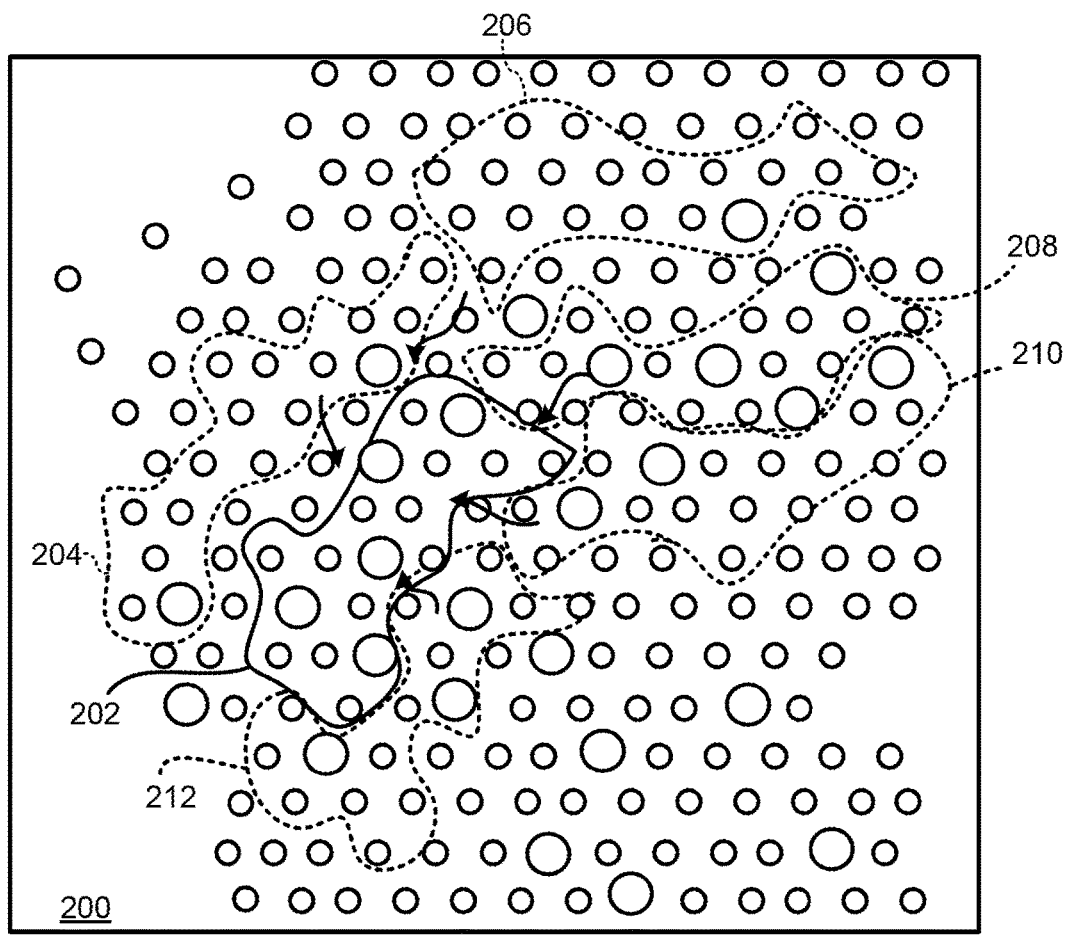
FIG. 2 illustrates multiple groups of high speed serial lanes pin-out on a printed circuit board.

FIG. 2 illustrates multiple groups of high speed serial lanes pin-out on the PCB 200, which includes multiple groups of high speed serial lanes 202, 204, 206, 208, 210, and 212. As the speed of high speed serial interfaces increases, variations in circuit design, component manufacture, environmental conditions, and other factors make it increasingly difficult to ensure highly reliable data transmission. In particular, transmitter and receiver equalization mechanisms to compensate for channel loss and crosstalk are calibrated on a best-effort basis, where settings that result in a "good enough" compensation solution are quickly obtained, in favor of iterative processes that might yield a more optimal solution, but which require an inordinate amount of time for such link training.

The groups of high speed lanes 202, 204, 206, 208, 210, and 212 can be PCIe groups, UPI groups, Infiniband groups, XAUI groups, or the like. In an embodiment, the pin-out of the different groups 202, 204, 206, 208, 210, and 212 can cause the pins of one group to be coupled to the pins of another group, such that crosstalk coupling can result across the different groups. The group of high speed lane or lanes with the weakest signal, such as group 202, can be the group affected the most by crosstalk from other groups. As shown by the arrows in FIG. 2, groups 204, 206, 208, 210, and 212 can all be coupled to group 202, such that these groups can weaken the signal or signals transmitted on the communication channel connected to the pin-outs of group 202 on PCB 200. Therefore, during the back channel adaption operation, the channel management modules 154 and 114 can communicate to reduce crosstalk between the different communication channels in the groups 202, 204, 206, 208, 210, and 212 as will be discussed with respect to FIG. 1.

Referring back to FIG. 1, the channel management module 154 can determine the weakest signal received from the transmitter 110. The transmitter 110 can then send a predetermined signal to the receiver 130 over the weakest serial lane, such as communication channel 120, at the same time that the transmitter sends signals across the other serial lanes, such as communication channel 122. In an embodiment, the signals sent on the other serial lanes can be referred to as aggressor signals. In an embodiment, the aggressor signals can be signals transmitted over all other serial lanes, can be the signals transmitted over a select number of serial lanes, such as the serial lanes nearest to the weakest lane on the PCB 200, or the like. The margin detector 150 can then derive an eye for the predetermined signal received on the communication channel 120, and store data for the eye in the register 150.

If the aggressor signals are defined as the signal transmitted across all of the other serial lanes in the transmitter 110, the crosstalk minimization operation can be referred to as a brute force operation because the channel management modules 154 and 114 do not identify the serial lanes that have the most effect on the weakest lane. However, the channel management modules 154 and 114 can introduce intelligence into the crosstalk minimization operation by identifying the serial lanes that cause the most crosstalk on the signal of the weakest lane. In this situation, identification of the serial lanes that cause the most crosstalk can be via board review of the PCB 200, heuristic analysis of similar PCBs that can be stored in a database of register 130, detection of lanes/groups of lanes nearest in proximity to the weakest lane on the PCB 200, or the like. Thus, the channel management modules 154 and 114 can identify the aggressor signals as either the signals on all other serial lanes, or the signals on the serial lanes that cause the most crosstalk on the weakest lane.

After the channel management module 154 and 114 have identified the aggressor signals, the channel management module 114 can cause the phase shift module 116 to introduce a phase shift into aggressor signals prior to signal being transmitted by the weakest lane and the lanes transmitting the aggressor signals. In an embodiment, the phase shift can be in any amount, such as 0.1 unit interval (UI) of a clock signal utilized in the transmission of the signals. The phase shift can also be in either the positive or negative direction.

The margin detector 140 can then derive a new eye plot for the signal on the weakest lane after reception of the signal on the weakest lane and the reception of the signals on the aggressor lanes. The margin detector 140 can then store the data for the new eye plot in register 150. The channel management module 154 can then determine whether an eye opening of the eye for the signal on the weakest serial lane has improved in response to phase shift of the aggressor signals. If the eye opening for the signal on the weakest lane has improved in response to the phase shift, the channel management module 114 can cause the phase shift module 116 to provide a second phase shift to the aggressor signals. Thus, the channel management modules 154 and 114 can cause an iterative process of increasing the phase shift of the aggressor signals until no improvement is detected in the eye plot of the signal on the weakest lanes.

When the eye opening for the signal on the weakest lane has not improved in response to most recent phase shift, the channel management module 154 can store the data associated with the most recent phase shift of the aggressor signals, and provide a signal to channel management module 114 to cause a phase shift on the aggressor signals in a direction opposite to the direction of the first iterative phase shift process. The channel management modules 154 and 114 can then control the iterative phase shift process in the second direction, and the margin detector 150 can derive an eye plot for the signal on the weakest lane after each iteration and the channel management module 154 can determine whether the eye of the current eye plot has improved. When the eye opening for the signal on the weakest lane has not improved in response to most recent the phase shift, the channel management module 154 can store the data associated with the most recent phase shift of the aggressor signals. The channel management module 114 can then determine the phase shift of the aggressor signals that resulted in the most improvement for the eye plot of the signal on the weakest lane and store the data associated with this phase shift along with the other derived data from the back channel adaptation. The transmitter 110 can then start sending signals to the receiver 130 using the data of the back channel adaption including the phase shift of the aggressor signals. In an embodiment, the phase shift can be for neighboring aggressor signals and not for all aggressor signals in the PCB 200.

Figure 3:
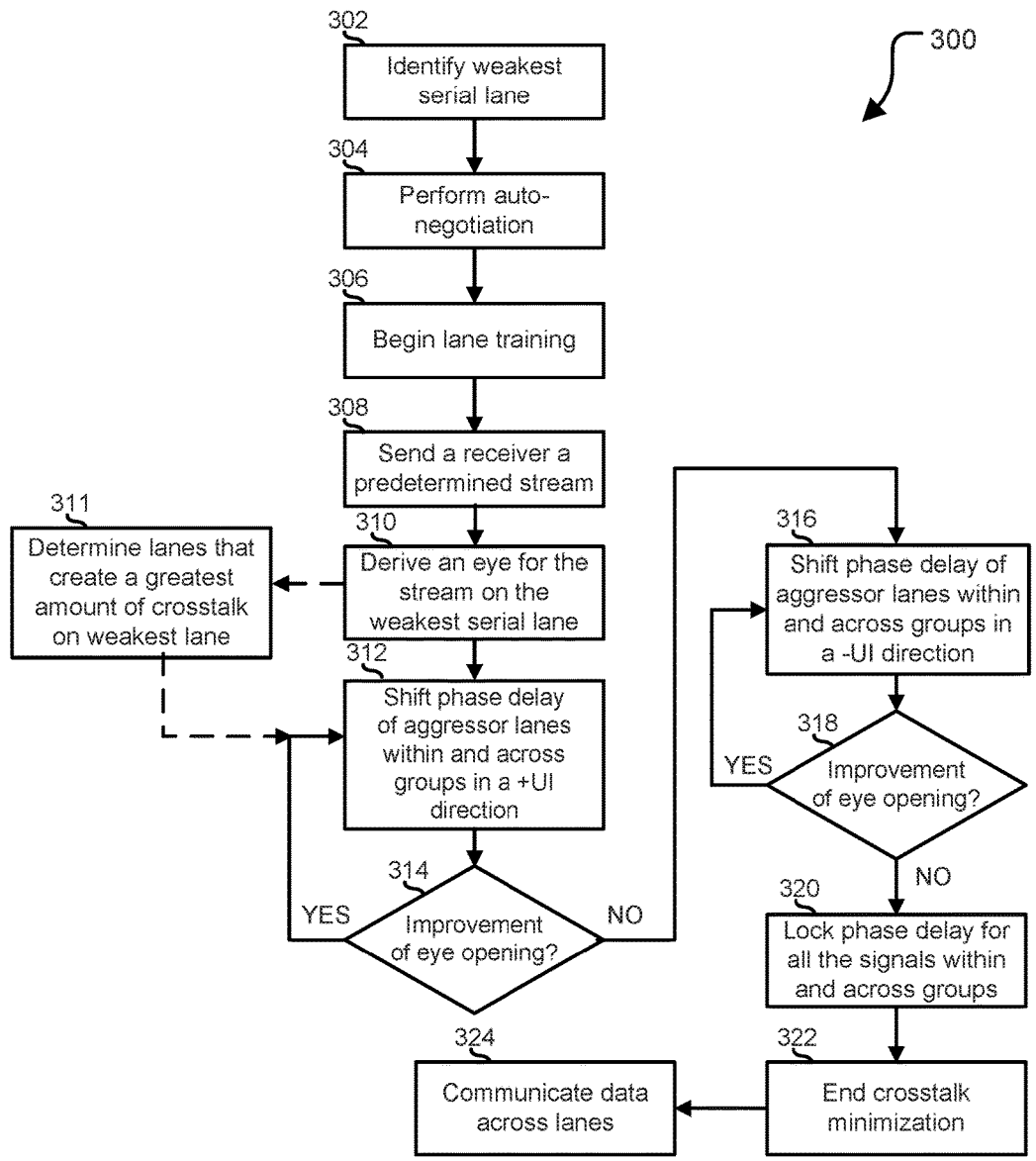
FIG. 3 is a flowchart illustrating a method of reducing crosstalk in a weakest serial link of a system according to an embodiment of the present disclosure.

FIG. 3 illustrates a method 300 for reducing crosstalk in a weakest serial link of a system according to an embodiment of the present disclosure. At block 302, a weakest serial lane in the system is identified. In an embodiment, the weakest serial lane can be identified by as the serial lane that has the highest level of signal attenuation as compared to the other serial lanes in the system. In an embodiment, the serial lanes can be grouped into one or more groups as shown in FIG. 2 above. At block 304, auto-negotiation is performed. Link training is begun at block 306. During link training, a transmitter and receiver in the system perform a back channel adaption operation as described above with respect to FIG. 1.

At block 308, a predetermined signal is sent to the receiver on the weakest serial lane. An eye for the predetermined signal is derived at block 310. In an embodiment, the eye is derived based values derived during the back channel adaption operation. At block 312, a phase shift is introduced into aggressor signals in a positive direction. In an embodiment, an aggressor signal is any signal that causes crosstalk with the signal in the weakest serial lane, such as signals transmitted on links or lane within the same group as the weakest serial lane, or signals transmitted on lanes within other groups in the system. The phase shift can be in any amount, such as 0.1 unit interval (UI) of a clock signal utilized in the transmission of the signals in the different transmission channels. In an embodiment, the phase shift is applied to all of the other signals in the system, and the phase shift can be applied to each of the other signals at the same time, at different intervals, or the like. In an embodiment, block 311 is executed prior to block 312. In this embodiment, a determination is made as to the lanes that create a greatest amount of crosstalk on the weakest serial lane at block 311.

The addition of block 311 into the method can provide intelligence into the crosstalk minimization instead of utilizing brute force phase shifting. In an embodiment, the brute force method applies the phase shifting to all other signals in the system. However, the intelligence phase shifting determines the lanes that have the greatest amount of crosstalk with the weakest lane as described above.

At block 314, a determination is made whether an eye opening of the eye for the signal on the weakest serial lane has improved in response to phase shift of the aggressor signals. If the eye opening for the signal on the weakest lane has improved in response to the phase shift, the flow continues as stated above at block 312 and another interval of phase shifting is applied to the signals on the aggressor lanes. However, if the eye opening for the signal on the weakest lane has not improved in response to most recent the phase shift, the flow continues at bock 316 and a phase shift is introduced into aggressor signals in a negative direction.

At block 318, a determination is made whether an eye opening of the eye for the signal on the weakest serial lane has improved in response to phase shift of the aggressor signals. If the eye opening for the signal on the weakest lane has improved in response to the phase shift, the flow continues as stated above at block 316 and another interval of phase shifting is applied in the negative direction to the signals on the aggressor lanes. However, if the eye opening for the signal on the weakest lane has not improved in response to most recent the phase shift, the flow continues at block 320 and the phase shift is locked for all of the aggressor signals. At block 322, the crosstalk minimization operation is ended. Data is communicated across the serial lanes at block 324.

Figure 4:
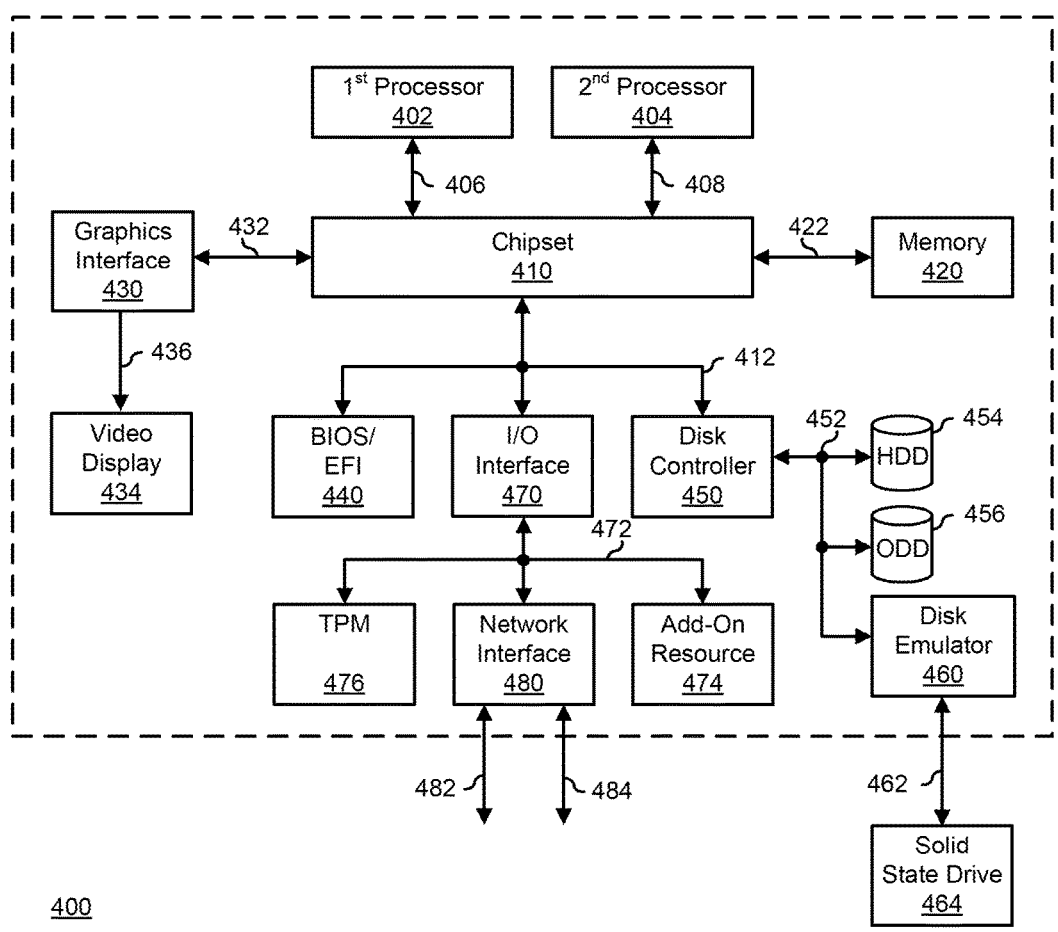
FIG. 4 is a block diagram illustrating a generalized information handling system according to an embodiment of the present disclosure.

FIG. 4 illustrates a generalized embodiment of information handling system 400. For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described above, and operates to perform one or more of the methods described above. Information handling system 400 includes a processors 402 and 404, a chipset 410, a memory 420, a graphics interface 430, include a basic input and output system/extensible firmware interface (BIOS/EFI) module 440, a disk controller 450, a disk emulator 460, an input/output (I/O) interface 470, and a network interface 480. Processor 402 is connected to chipset 410 via processor interface 406, and processor 404 is connected to the chipset via processor interface 408. Memory 420 is connected to chipset 410 via a memory bus 422. Graphics interface 430 is connected to chipset 410 via a graphics interface 432, and provides a video display output 436 to a video display 434. In a particular embodiment, information handling system 400 includes separate memories that are dedicated to each of processors 402 and 404 via separate memory interfaces. An example of memory 420 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 440, disk controller 450, and I/O interface 470 are connected to chipset 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 440 includes BIOS/EFI code operable to detect resources within information handling system 400, to provide drivers for the resources, initialize the resources, and access the resources. BIOS/EFI module 440 includes code that operates to detect resources within information handling system 400, to provide drivers for the resources, to initialize the resources, and to access the resources.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits a solid-state drive 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O interface 470 includes a peripheral interface 472 that connects the I/O interface to an add-on resource 474, to a TPM 476, and to network interface 480. Peripheral interface 472 can be the same type of interface as I/O channel 412, or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as chipset 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   identifying, by a hardware control module, a first lane as a weakest lane of a plurality of high speed serial lanes, wherein the weakest lane is a lane that has a highest level of signal attenuation as compared to other lanes;
   identifying a second lane with a greatest amount of crosstalk with the weakest lane;
   shifting a phase of a first signal transmitted on the second lane;
   deriving an eye margin for a second signal on the weakest lane;
   iteratively changing an amount of the shifting of the phase of the first signal in a first direction, and deriving the eye margin for the second signal after each iteration until the eye margin of the second signal remains the same from one iteration to a next iteration; and
   storing a final phase value for the first signal in response to the eye margin of the second signal remaining the same from one iteration to the next iteration.

2. The method of claim 1, further comprising:
   iteratively changing a phase of a third signal transmitted on a third lane until the eye margin of the second signal remains the same from one iteration to the next iteration;

in response to each iterative change of the phase of the third signal, deriving the eye margin for the second signal; and storing a final phase value for the third signal in response to the eye margin of the second signal remaining the same from one iteration to the next iteration.

3. The method of claim 1, further comprising:
identifying the first signal on the second lane as an aggressor signal based on an amount of crosstalk caused by the first signal on the second signal on the weakest lane prior to iteratively shifting the phase of the first signal.

4. The method of claim 1, wherein the first direction is a positive direction.

5. The method of claim 1, wherein the first direction is a negative direction.

6. The method of claim 1, wherein the second lane is in a same group of lanes as the weakest lane.

7. The method of claim 1, wherein the second lane is in a different group of lanes from the weakest lane.

8. A method comprising:
identifying, by a hardware control module, a first lane as a weakest lane of a plurality of high speed serial lanes, wherein the weakest lane is a lane that has a highest level of signal attenuation as compared to other lanes;
iteratively shifting a phase of aggressor signals transmitted on the other lanes of the high speed serial lanes in a first direction, wherein the other lanes cause a greatest amount of crosstalk on the weakest lane;
deriving an eye margin for a signal on the weakest lane after each iteration of shifting the phase of the aggressor signals in the first direction;
changing an amount of the shifting of the phase of the aggressor signal in the first direction after each iteration until the eye margin of the signal on the weakest lane remains the same from one iteration to a next iteration; and
storing final phase values of the first direction for the aggressor signals in response to the eye margin of a first signal remaining the same from one iteration to the next iteration.

9. The method of claim 8, further comprising:
iteratively shifting the phase of the aggressor signals transmitted on the other lanes of the high speed serial lanes in a second direction;
deriving the eye margin for the signal on the weakest lane after each iteration of shifting the phase of the aggressor signals in the second direction;
changing an amount of the shifting of the phase of the aggressor signals in the second direction after each iteration until the eye margin of the signal on the weakest lane remains the same from the one iteration to the next iteration; and
storing final phase values of the second direction for the aggressor signals in response to the eye margin of the first signal remaining the same from the one iteration to the next iteration.

10. The method of claim 8, further comprising:
identifying the aggressor signals in the other lanes based on an amount of crosstalk caused by the aggressor signals on the first signal on the weakest lane prior to iteratively shifting the phase of the aggressor signals.

11. The method of claim 10, wherein the other lanes are less than all of a remaining number of the high speed serial lanes.

12. An information handling system comprising:
a receiver including:
a margin detector to derive eye plots for a plurality of signals received via a plurality of high speed serial lanes for each crosstalk minimization iteration of a plurality of crosstalk minimization iterations;
a first control module to communicate with the margin detector, the first control module to identify a weakest lane of the high speed serial lanes, and to compare eye plots for a first signal on the weakest lane from one crosstalk minimization iteration to a next crosstalk minimization iteration, wherein the weakest lane is a lane that has a highest level of signal attenuation as compared to other lanes; and
a transmitter including:
a second control module to communicate with the first control module, the second control module to receive the first signal from the first control module indicating whether an eye plot of the first signal has improved from one crosstalk minimization iteration to the next crosstalk minimization iteration, and to iteratively control a phase shift of aggressor signals in other lanes of the high speed serial lanes in a first direction during each crosstalk minimization iteration until the eye plot of the first signal remains the same from one crosstalk minimization iteration to the next crosstalk minimization iteration, wherein the aggressor signals cause most crosstalk on a first signal on the weakest lane; and
a phase shift module to communicate with the second control module, the phase shift module to phase shift the aggressor signals during each iteration of the crosstalk minimization iterations.

13. The information handling system of claim 12, the first control module further to identify the aggressor signals in the other lanes based on an amount of crosstalk caused by the aggressor signals on the first signal on the weakest lane.

14. The information handling system of claim 12, the first control module further to store final phase values for the aggressor signals in response to the eye margin of the eye plot of the first signal remaining the same from one iteration to the next.

15. The information handling system of claim 12, the second control module to iteratively control a phase shift of the aggressor signals in the high speed serial lanes in a second direction during each crosstalk minimization iteration until the eye plot of the first signal remains the same from one crosstalk minimization iteration to the next crosstalk minimization iteration.

16. The information handling system of claim 15, the first control module further to store final phase values in the second direction for the aggressor signals in response to the eye margin of the eye plot of the first signal remaining the same from one iteration to the next.

17. The information handling system of claim 12, wherein the first direction is a positive direction.

18. The information handling system of claim 12, wherein the first direction is a negative direction.

19. The information handling system of claim 12, wherein the other lanes of the high speed serial lanes are in a same group of lanes as the weakest lane.

20. The information handling system of claim 12, wherein the other lanes of the high speed serial lanes are in a different group of lanes from the weakest lane.

* * * * *